(12) United States Patent
Brandstrom

(10) Patent No.: US 6,800,164 B2
(45) Date of Patent: Oct. 5, 2004

(54) METHOD OF MAKING A FIBER REINFORCED ROD

(76) Inventor: Randel Brandstrom, 8713-53rd Avenue, Edmonton, Alberta (CA), T6E-5E9

( * ) Notice: Subject to any disclaimer, the term of this patent is extended or adjusted under 35 U.S.C. 154(b) by 189 days.

(21) Appl. No.: 10/003,702

(22) Filed: Dec. 6, 2001

(65) Prior Publication Data

US 2002/0056508 A1 May 16, 2002

(51) Int. Cl.[7] .............................................. B65H 81/00
(52) U.S. Cl. ........................ 156/166; 156/180; 156/242; 156/245; 156/433; 156/441
(58) Field of Search .................................. 156/242, 245, 156/166, 180, 433, 441; 264/136, 137

(56) References Cited

U.S. PATENT DOCUMENTS

| | | | | |
|---|---|---|---|---|
| 2,949,054 A | * | 8/1960 | White ........................ | 411/418 |
| 3,495,494 A | * | 2/1970 | Scott ......................... | 411/411 |
| 3,793,108 A | | 2/1974 | Goldsworthy | |
| 3,859,409 A | * | 1/1975 | Coonrod ..................... | 264/295 |
| T0,101,401 I4 | * | 1/1982 | Zion .......................... | 156/166 |
| 4,394,338 A | | 7/1983 | Fuwa | |
| 4,445,957 A | | 5/1984 | Harvey | |
| 5,152,945 A | * | 10/1992 | Thicthener et al. ......... | 264/136 |
| 5,174,844 A | | 12/1992 | Tong | |
| 5,626,700 A | * | 5/1997 | Kaiser ........................ | 156/180 |
| 5,851,468 A | | 12/1998 | Kaiser | |
| 5,876,553 A | | 3/1999 | Kaiser | |

FOREIGN PATENT DOCUMENTS

| | | |
|---|---|---|
| DE | 25 00 375 A | 7/1976 |
| EP | 0 531 667 A | 3/1993 |
| GB | 2282096 | 3/1995 |
| WO | WO 96 00647 A | 1/1996 |
| WO | WO 98 15403 A | 4/1998 |

OTHER PUBLICATIONS

C–Bar Reinforcement News (4 pages).
Marshall Industries Composites C–Bar brochure (6 pages).

* cited by examiner

Primary Examiner—Jeff H. Aftergut
(74) Attorney, Agent, or Firm—Adrian D. Battison; Michael R. Williams; Ryan W. Dupuis

(57) ABSTRACT

A composite reinforcing rod is formed by providing a reinforcing material supply of fiber strands rovings; a resin supply bath, and a puller for pulling the resin-impregnated reinforcing material through the resin bath. A hot compression (or autoclave) apparatus includes two half autoclave molds, which can be arranged in a reciprocating die autoclave or a tractor die autoclave process. A mandrel or plastics tubing core may be used to form a hollow shape of the composite materials to get an external threaded composite tubing. The two autoclave molds have an internal thread and clamp to form the threaded section in the outer of the resin-impregnated reinforcing material. The molds press and squeeze the resin out of the impregnated fibers to the mold internal surfaces, and push the outer fibers longitudinal roving fibers toward the crest of the thread of the molds so that the thread when formed is reinforced by fibers extending into the core of the rod. The die includes two die parts each forming a part of the hollow cylindrical interior and including mating surfaces on either side. The die parts open in a direction at right angles to a plane joining the edges of the die parts at an angle to the plane of the mating surfaces and then close by moving in a first direction to close the mating surfaces and then in a second direction along the mating surfaces to sweep un-set resin from the surfaces into the hollow interior.

9 Claims, 9 Drawing Sheets

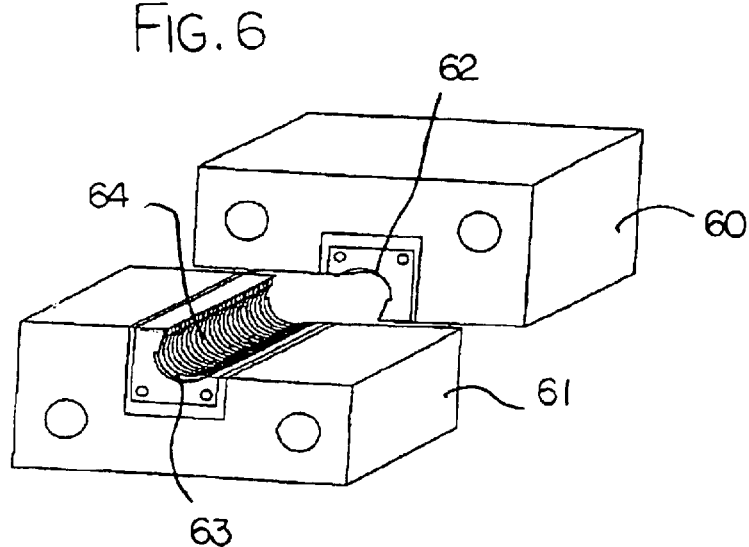
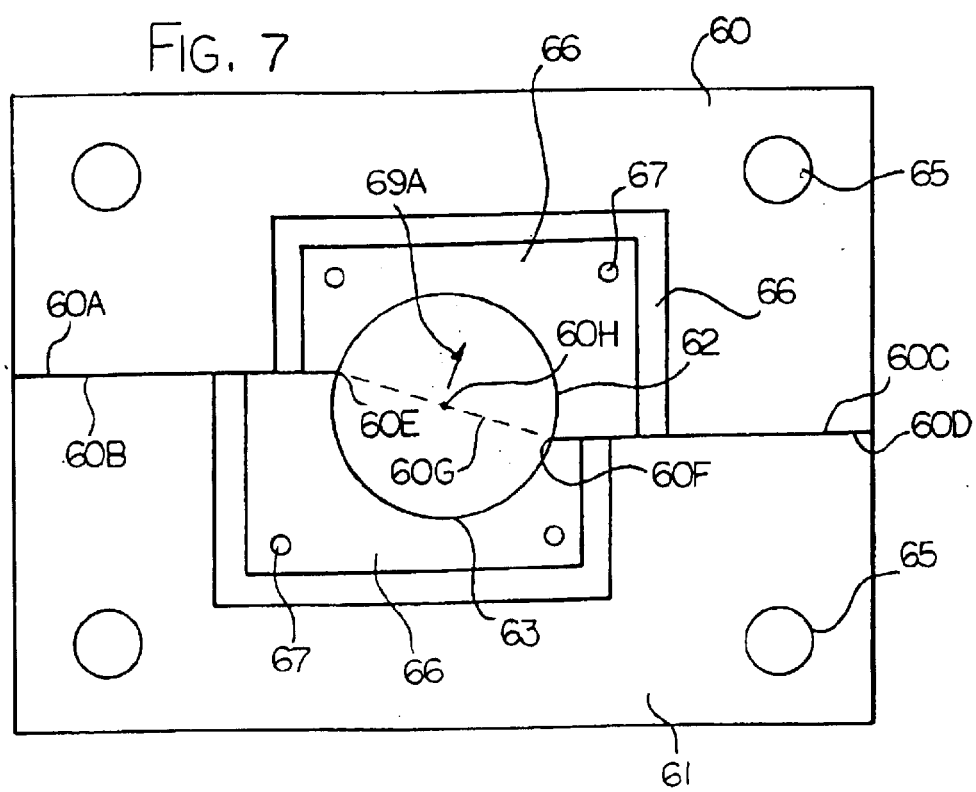

METHOD OF MAKING A FIBER REINFORCED ROD

The present invention relates a method for manufacture of fiber reinforced rod.

The term "rod" as used herein is intended to include bars and rods which are hollow, that is tubing. The outside surface is preferably but not necessarily of circular cross-section. The rods can be of any length including elements which are relatively short so that they are sometimes referred to as "bolts".

BACKGROUND OF THE INVENTION

The use of fiber reinforced plastics (FRP) rods in construction, marine, mining and others has been increasing for years. This is because FRP has many benefits, such as non-(chemical or saltwater) corroding, non-metallic (or non-magnetic) and non-conductive, about twice to three times tensile strength and ¼ weight of steel reinforcing rod, a coefficient of thermal expansion more compatible with concrete or rock than steel rod. Most of the bars are often produced by pultrusion process and have a linear or uniform profile. Conventional pultrusion process involves drawing a bundle of reinforcing material (e.g., fibers or fiber filaments) from a source thereof, wetting the fibers and impregnating them (preferably with a thermosettable polymer resin) by passing the reinforcing material through a resin bath in an open tank, pulling the resin-wetted and impregnated bundle through a shaping die to align the fiber bundle and to manipulate it into the proper cross-sectional configuration, and curing the resin in a mold while maintaining tension on the filaments. Because the fibers progress completely through the pultrusion process without being cut or chopped, the resulting products generally have exceptionally high tensile strength in the longitudinal direction (i.e., in the direction the fiber filaments are pulled). Exemplary pultrusion techniques are described in U.S. Pat. No. 3,793,108 to Goldsworthy; U.S. Pat. No. 4,394,338 to Fuwa; U.S. Pat. No. 4,445,957 to Harvey; and U.S. Pat. No. 5,174,844 to Tong.

FRP uniform profile or linear rods offer several advantages in many industrial applications. The rods are corrosion resistant, and have high tensile strength and weight reduction. In the past, threaded steel rods or bolts had been widely used in engineering practice. However, long-term observations in Sweden of steel bolts grouted with mortar have shown that the quality of the grouting material was insufficient in 50% of the objects and more bolts have suffered from severe corrosion (see reference Hans K. Helfrich). In contrast with the steel bolts, the FRP bolts are corrosion resistant and can be simultaneously used in the temporary support and the final lining, and the construction costs of single lining tunnels with FRP rock bolts are 33% to 50% lower than of tunnels with traditional in-site concrete (see reference Amberg Ingenieurburo AG, Zurich). This FRP rock bolting system is durable and as a part of the final lining supports a structure during its whole life span. Furthermore, due to their seawater corrosion resistance, the FRP bolts and anchors are also proven as good solutions in waterfront (e.g., on-shore or off-shore seawalls) to reinforce the concrete structures. In general the fibreglass rod/bolt is already an important niche, and will be a more important product to the mining and construction industries. The critical needs of these industries are for structural reinforcements that provide long-term reliability that is of cost-effective. The savings in repair and maintenance to these industries will be significant, as the composite rebar will last almost indefinitely.

The mining industry requires composite rods for mining shafts or tunnel roof bolts. These rods are usually carried by hand and installed overhead in mining tunnel, so there is a benefit that the fibreglass rod is ¼ the weight and twice the strength of steel rebar which are widely used currently. Fibreglass rod also does not damage the mining equipment. In construction industries, such as bridges, roads, seawall and building structures, reinforcements of the steel rebar have been widely used and the most of steel rebars have been corroded after a few years of service life. Typically, the structures with the steel rebars are often torn down after a period of time. Therefore, the use of the corrosion resistant composite rebars have been increased for construction industries in recent years.

Non-uniform profile or non linear threaded rods are also required in many industrial applications. For example, threaded FRP rods and associated nuts have been used as rock bolting system in mining industries (e.g., for tunnel roof bolts), as threaded reinforcing rebar structures in construction industries (e.g., in bridge construction), as well as seawall bolting system in marine structures.

The structures of the threaded composite rods from existing manufacturing technology consist of two styles:

(1) Pultruded rod with machined threads in outside surface, and (2) Pultruded rod has a core of fiber rovings with plastic materials molded outside the core to form threads.

In style (1), the problem of machining composite rebar surface after it is fully cured is that the fibers in a depth of surface are cut into segments. The benefit of high tensile strength of the fibers are lost when they are cut into short lengths. The strength of the threads now rely on the shear strength of the cured resin which is much less than that of the fibers. Thus, the rebar could not be used under tension since the threads of the rebar will shear away from the core. The rebar uses a specially designed nut that compresses against the rebar to give it holding strength when a load is placed on the rebar. The nut of threaded onto the rebar has just enough resistance to take up any slack between the nut and the thread surface. Therefore the nut is used without pre-tension.

In style (2), the rebar has a core of fiberglass rovings and a plastics molded threads surface. This rebar is only capable of withstanding a small amount of longitudinal loads. This is because the threads formed by the molded plastics lack the fiberglass reinforcements for having the longitudinal strength. Other rebars, such as those shown in a brochure by Marshall Industries Composites Inc C-BAR 1996, are a combination of a fiber-reinforced polyester core and a urethane-modified vinyl ester outer skin, which do not include the thread features in rebar surface.

There is therefore a need in mining, construction and other industries for composite rod and nut fastening system that the rod and nut have a fully threaded feature without the disadvantages of the style (1) and (2) described in the paragraph above.

SUMMARY OF THE INVENTION

In view of the foregoing, it is one object of the present invention to provide a fully threaded glass-fiber reinforced composite rod, and associated mechanical fastening system.

It is also an object of the present invention to provide a method for manufacturing a molded rod by pressing and squeezing the resin out of the impregnated fibers to the mold internal surfaces.

According to the invention there is provided a method for forming a threaded rod comprising:

providing a longitudinally continuous fibrous structure formed of a plurality of fibers;

the fibrous structure including longitudinally extending continuous fibers;

impregnating the fibrous structure with a settable resin;

collating the impregnated fibrous structure including the longitudinally extending continuous fibers into an elongate continuous rod in which the resin throughout the rod is an un-set condition;

providing a generally cylindrical die having a plurality of die parts for surrounding a portion of the rod and for extending along a part of the length of the rod, which die parts can be opened in a direction transverse to the length of the rod to receive the rod and clamped together to form a hollow die interior defining a generally cylindrical shape with a continuous helical thread therealong;

in a compression step, closing the die parts into a closed position onto the portion of the length of the impregnated fibrous structure while the resin remains in the un-set condition so as to apply a compressive force from the die parts onto the rod in a direction transverse to the length to cause the portion of the fibrous structure to conform to the shape of the hollow interior and thus to mold on the fibrous structure a helical thread which is substantially continuous along the portion and which has a helical thread root having a minimum diameter at a core of the fibrous and a helical thread crest having a maximum diameter;

and causing the compressive force within the hollow interior so as to distort some of the longitudinally extending continuous fibers of the portion of the rod such that a portion of the distorted fibers lies inwardly of the root and a portion extends into the thread toward the crest such that the thread is reinforced by the longitudinally extending continuous fibers which extend from the thread into the core;

heating the die parts to set the resin in the portion;

moving the die parts from the closed position to a release position;

with the die parts in the release position, pulling the rod with the resin set therein longitudinally so as to move the portion of the rod with the molded thread thereon longitudinally out of the die and to move a further portion of the rod with the resin in an un-set condition impregnated therein into the die;

and repeating the compression step on the further portion.

Where the above definition refers to movement of the die parts, it will be appreciated that one or both part may be moveable or one may be fixed to obtain the required relative movement between them as set forth.

If it is required to be hollow, there may be provided a mandrel inside the die to form a hollow interior of the rod or there may be provided a tubing core inside the rod.

Preferably the die parts include a first die part and a second die part, each of the die parts having a part cylindrical surface forming a part of the hollow die interior defining the generally cylindrical shape such that, when the die parts are in closed position, the part cylindrical surfaces are coaxial to form the hollow die interior; wherein the first die part and the second die part each include parallel mating surfaces on each side of the part cylindrical surface; and wherein the first and second die parts are moved in the compression step from the release position in which the mating surfaces of the first die part are spaced from the mating surfaces of the second die part in a first direction transverse to the mating surfaces to bring the mating surfaces into contact together with the part cylindrical surfaces axially offset and in a second direction parallel to the mating surfaces to bring the part cylindrical surfaces into the closed co-axial position to form the hollow die interior into the generally cylindrical shape.

Preferably the mating surfaces of the first and second die parts on one side of the part cylindrical surfaces lie in a first plane which is parallel to and spaced from a second plane containing the mating surfaces of the first and second die parts on an opposed side of the part cylindrical surfaces.

Preferably the first and second die parts are moved from the closed position to the release position in a direction which is inclined to a right angle to the mating surfaces.

Preferably the first and second die parts are moved from the closed position to the release position in a direction which is substantially at right angles to a plane intersecting edges of the part cylindrical surfaces.

Preferably movement of the first and second die parts in the second direction, with the mating surfaces in contact, causes un-set resin to be swept from the mating surfaces into the hollow die interior.

Preferably the first and second die parts move from the closed position to the release position and back to the closed position in a generally triangular path.

Preferably the die parts include a first die part and a second die part, each of the die parts having a part cylindrical surface forming a part of the hollow die interior defining the generally cylindrical shape such that, when the die parts are in closed position, the part cylindrical surfaces are coaxial to form the hollow die interior; the first die part and the second die part each include parallel mating surfaces on each side of the part cylindrical surface; and the mating surfaces of the first and second die parts on one side of the part cylindrical surfaces lie in a first plane which is parallel to and spaced from a second plane containing the mating surfaces of the first and second die parts on an opposed side of the part cylindrical surfaces.

Preferably the first and second die parts are moved from the closed position to the release position in a direction which is inclined to a right angle to the mating surfaces.

Preferably the first and second die parts are moved from the closed position to the release position in a direction which is substantially at right angles to a plane intersecting edges of the part cylindrical surfaces.

According to a second aspect of the invention there is provided a method for forming a molded rod comprising:

providing a longitudinally continuous fibrous structure formed of a plurality of fibers;

the fibrous structure including longitudinally extending continuous fibers;

impregnating the fibrous structure with a settable resin;

collating the impregnated fibrous structure including the longitudinally extending continuous fibers into an elongate continuous rod in which the resin throughout the rod is an un-set condition;

providing a generally cylindrical die having a plurality of die parts for surrounding a portion of the rod and for extending along a part of the length of the rod, which die parts can be opened in a direction transverse to the length of the rod to receive the rod and clamped together to form a hollow die interior defining a generally cylindrical shape;

in a compression step, closing the die parts into a closed position onto the portion of the length of the impregnated fibrous structure while the resin remains in the un-set condition so as to apply a compressive force from the die parts onto the rod in a direction transverse to the length to cause the portion of the fibrous structure to conform to the shape of the hollow interior;

heating the die parts to set the resin in the portion;

and moving the die parts from the closed position to a release position;

wherein the die parts include a first die part and a second die part, each of the die parts having a part cylindrical surface forming a part of the hollow die interior defining the generally cylindrical shape such that, when the die parts are in closed position, the part cylindrical surfaces are coaxial to form the hollow die interior;

wherein the first die part and the second die part each include parallel mating surfaces on each side of the part cylindrical surface;

and wherein the first and second die parts are moved in the compression step from the release position in which the mating surfaces of the first die part are spaced from the mating surfaces of the second die part in a first direction transverse to the mating surfaces to bring the mating surfaces into contact together with the part cylindrical surfaces axially offset and in a second direction parallel to the mating surfaces to bring the part cylindrical surfaces into the closed co-axial position to form the hollow die interior into the generally cylindrical shape.

According to a third aspect of the invention there is provided a method for forming a molded rod comprising:

providing a longitudinally continuous fibrous structure formed of a plurality of fibers;

the fibrous structure including longitudinally extending continuous fibers;

impregnating the fibrous structure with a settable resin;

collating the impregnated fibrous structure including the longitudinally extending continuous fibers into an elongate continuous rod in which the resin throughout the rod is an un-set condition;

providing a generally cylindrical die having a plurality of die parts for surrounding a portion of the rod and for extending along a part of the length of the rod, which die parts can be opened in a direction transverse to the length of the rod to receive the rod and clamped together to form a hollow die interior defining a generally cylindrical shape;

in a compression step, closing the die parts into a closed position onto the portion of the length of the impregnated fibrous structure while the resin remains in the un-set condition so as to apply a compressive force from the die parts onto the rod in a direction transverse to the length to cause the portion of the fibrous structure to conform to the shape of the hollow interior;

heating the die parts to set the resin in the portion;

and moving the die parts from the closed position to a release position;

wherein the die parts include a first die part and a second die part, each of the die parts having a part cylindrical surface forming a part of the hollow die interior defining the generally cylindrical shape such that, when the die parts are in closed position, the part cylindrical surfaces are coaxial to form the hollow die interior;

wherein the first die part and the second die part each include parallel mating surfaces on each side of the part cylindrical surface;

and wherein the mating surfaces of the first and second die parts on one side of the part cylindrical surfaces lie in a first plane which is parallel to and spaced from a second plane containing the mating surfaces of the first and second die parts on an opposed side of the part cylindrical surfaces.

If threaded, the thread may extend along the full length of the rod or thread portions may be separated each from the next by a short length where the rod is not threaded or smooth. Such smooth portions are provided between each molded section and the next to avoid misalignment of the threads formed by the molds which could cause damage to the molds. Molding techniques which avoid this alignment problem as described hereinafter can provide a method for generating a continuous thread.

The present invention thus may provide a fully threaded FRP rod for use with a mechanical fastening systems, a forming process of the threaded composite bars, and the apparatus for making such the threaded rods. The threaded rods can operate with a nut or coupling to be screwed onto the ends of the rod. The rods can be tensioned with the nut or jointed together with 45, 90, etc., elbow couplings to allow the rod to make turns or bends. The threaded rod can also be fastened together to make various patterns for reinforced concrete. The threaded rod can also be jointed together with FRP or plastic nut connectors to extend to any length of the rod in sites to avoid transportation problems. The threads on the rod are not only used for screwing on nuts and adapters, but they also provide an excellent anchoring system when the rod is glued or grouted into rock or concrete. The threads make it very difficult for the rod to be pulled out of the rock or concrete cement.

BRIEF DESCRIPTION OF THE DRAWINGS

FIG. 6 is an isometric view of the die of the method of FIG. 2A.

FIGS. 7, 8 and 9 are front elevational views of the die of FIG. 6 showing the shape and movement of the die parts between the closed and release positions.

DETAILED DESCRIPTION OF THE INVENTION

The present invention will now be described more particularly hereinafter with reference to the accompanying drawings, in which embodiments of the invention are shown. The invention can, however, be embodied in many different forms and should not be limited to the embodiments set forth herein; rather, these embodiments are provided so that this disclosure will be thorough and complete and will fully convey the scope of the invention to those skilled in this art.

Figure 1:
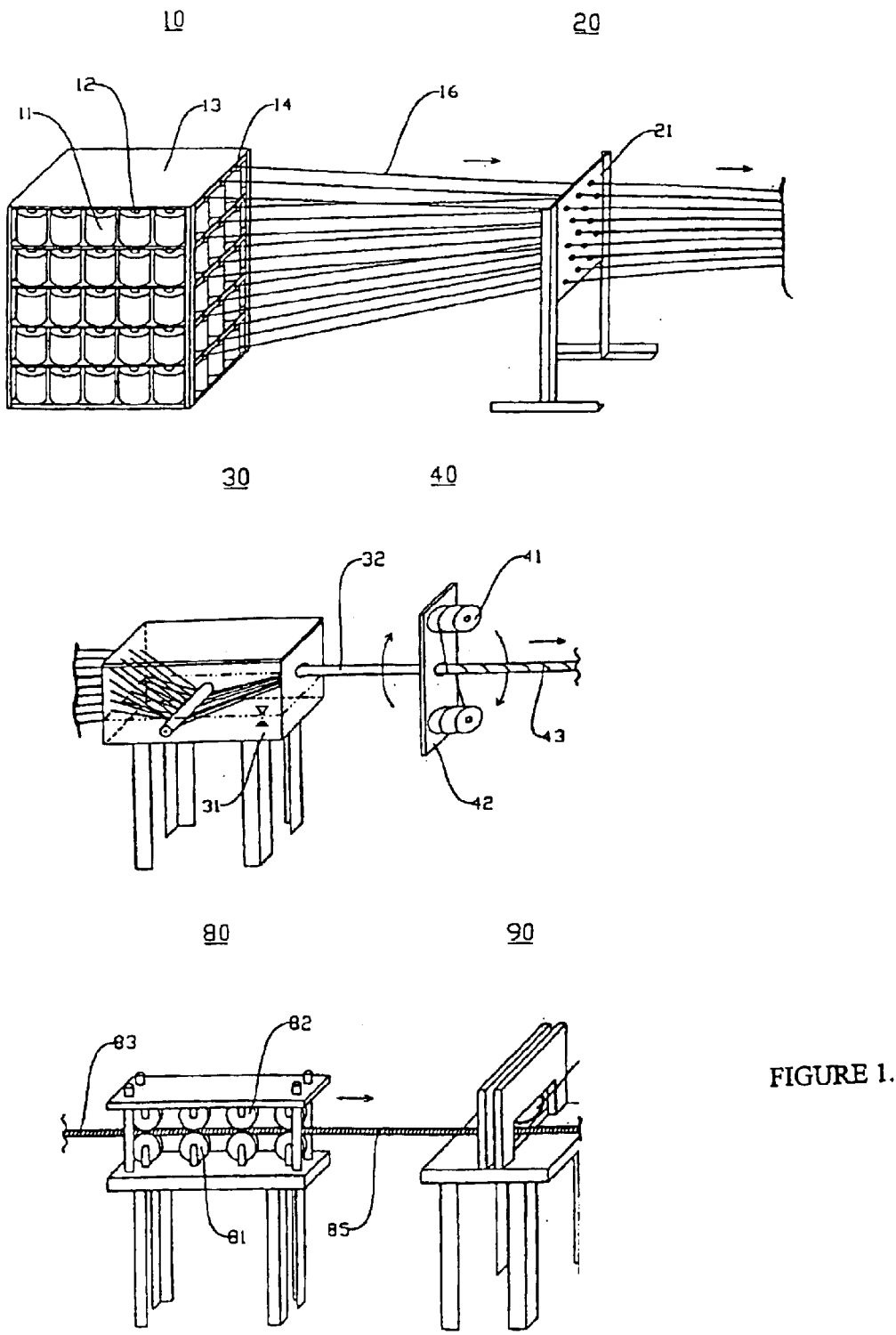
FIG. 1 is a schematic representation of the fully threaded composite rod-forming apparatus of the present invention.

Referring now to the drawings, the apparatus for forming the threaded rod of the present invention is illustrated in FIG. 1 and preferably uses the die parts of the type shown in FIGS. 2A, 6, 7, 8 and 9, described in more detail hereinafter. The apparatus comprises a reinforcing material supply station 10, a creel guide 20, a resin bath 30, a circumferential winder 40, a two halves die autoclave station 50 (FIG. 2A), or a reciprocating die autoclave station 60 (FIG. 2B), or a tractor die autoclave station 70 (FIG. 2C), a tension puller 80 and a cutting station 90. The reinforcing material supply 10 comprises a plurality of reinforcing material 11 on a plurality of spools 12 mounted on a storage rack, such as the bookshelf style creel 14 shown in FIG. 1.

The reinforcing material 11 comprises fibers selected from the group consisting of fibers of glass, carbon, metal, aromatic polyamides, polybenzimidazoles, aromatic polyimides, polyethylene, nylon, and blends and hybrids thereof. These fibers are supplied in the form of a roving, mat, veil, fabric or the like. Typically, the reinforcing material is glass fibers in the form of a roving. The creel 14 can include virtually any number of spools 12; creels including 100 or more spools are common. Preferably, the reinforcing material 16 is drawn from the spools 12 through a series of ceramic bushings (not shown) positioned at the front of the creel 14 to maintain alignment and reduce breakage of the reinforcing material 16.

The suitable reinforcing fibers 11 are carbon, glass, metal, high modulus organic fibers (e.g., aromatic polyamides, polybenzimidazoles, and aromatic polyimides), and other organic fibers (e.g., polyethylene, liquid crystal and nylon). Blends and hybrids of the various fibers can also be used. Higher tensile strengths can be accomplished with different kinds of fibers having a higher tensile strength. These can be treated to provide other properties such as corrosion resistance.

Turning to FIG. 1, from the creel 14, the reinforcing material 16 is guided via a creel guide to the bath 30 (shown in FIG. 1) of an unsaturated polyester resin or other thermosetting resin 31 such as vinyl ester resins, polyurethanes, epoxies, and phenolics. The organizer card 21 controls alignment to prevent twisting, knotting or any other damage to the reinforcing material 16. The reinforcing material 16 is directed to the bath 30, wherein the reinforcing material 16 is immersed in and thereby impregnated with a pool of resin 31. Other techniques for impregnating the reinforcing material with resin, such as direct injection, sleeve immersion, and the like, are also suitable for use with the present invention.

The resin material is preferably a thermosetting resin. The term "thermosetting" as used herein refers to resins which irreversibly solidify or "set" when completely cured. Suitable thermosetting resins include unsaturated polyester, phenolic resins, vinyl ester resins, polyurethanes, and the like, and mixtures and blends thereof. Additionally, the thermosetting resins useful in the present invention may be mixed or supplemented with other thermosetting or thermoplastic resins. Exemplary supplementary thermosetting resins include epoxies. Exemplary thermoplastic resins include polyvinylacetate, styrene-butadiene copolymers, polymethylmethacrylate, polystyrene, cellulose acetatebutyrate, saturated polyesters, urethane-extended saturated polyesters, methacrylate copolymers, polyethylene terephthalate (PET), and the like in a manner known to one skilled in the art.

Thickening or partial curing is achieved in a variety of ways. For example, the thermosetting resin may be thickened by the inclusion of a thickening agent. Suitable thickening agents are commonly known to those skilled in the art and include crystalline unsaturated polyester, polyurethanes, alkali earth metal oxides and hydroxides, and polyureas. The amount of thickening agent added to the thermosetting resin will vary depending upon the particular thermosetting resin employed. The resin material also may include an initiator system, which cooperates with the conditions of the hot compression molding to thicken the resin material by curing the resin material. The initiator system may be present in addition to any of the foregoing thickening agents, or as an alternative thereto. A catalyst such as organic peroxide initiator is employed to facilitate curing of the chemical thickening composition. Such catalysts are described in U.S. Pat. Nos. 4,062,826, 4,073,828; and 4,232,133, the disclosures of which are incorporated by reference herein.

Figure 2A:
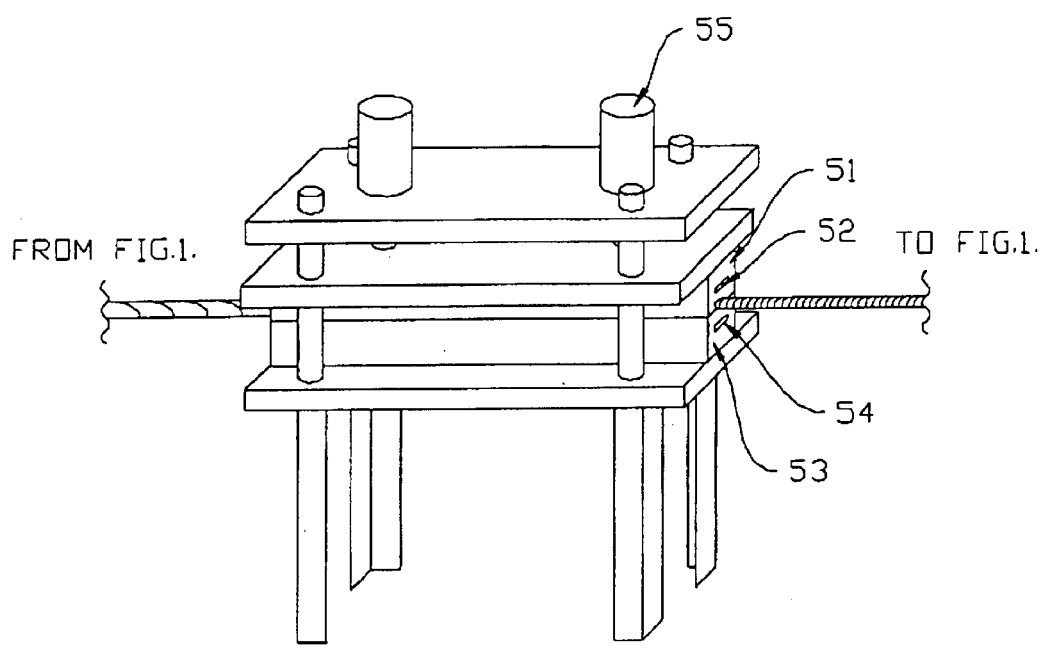
FIG. 2A is a schematic illustration of a preferred method of two halves die autoclave to form the fully threaded composite rod indicated in FIG. 1.

Turning again to FIG. 1, the reinforcing fibers 32, which are impregnated with the resin 31, can comprise of the order of 60 to 90 percent fibers by weight. Additionally the reinforcing fibers 32 may be circumferentially wound with additional reinforcing fibers or mats to provide additional strength thereto and to enhance the mechanical bonding of the core to the surface threads. After impregnation, the impregnated reinforcing material 32 can then travel through the circumferential winder 40 positioned prior to the two halves die station 50 of the hot compression molding process. The circumferential winder 40 mainly comprises a rotating plate and several rolls of fiber filament or mat rovings. The winder 40 wraps one or more fiber layers around a bunch core of the reinforcing material 32. The fibers layers are typically oriented in an inclined direction rather than in the longitudinal direction of core of the reinforcing material 32. Preferably, two fiber layers are added: one that is placed on the core so that its fibers are oriented at 20~60 degree angle to the core fibers, and another that is placed on the core so that its fibers are wrapped in reverse direction and oriented to be perpendicular to the first wrap and 20~60 degree relative to the core fibers. The wrap angles can be controlled by the number of rotational rolls of the reinforcing material rovings 41 added and the speed of the winding and pulling. The fiber layers, if used, add torsional strength to the core, particularly in non-longitudinal directions. In addition, because the fiber layers are added to the core as a fibrous surface, the fibers contained therein remain on the surface of the core 32 as it travels to the molding stations as shown in FIG. 2A, and the resin therein should be sufficiently viscous to be easily molded by the mold stations 50.

Figure 5A:
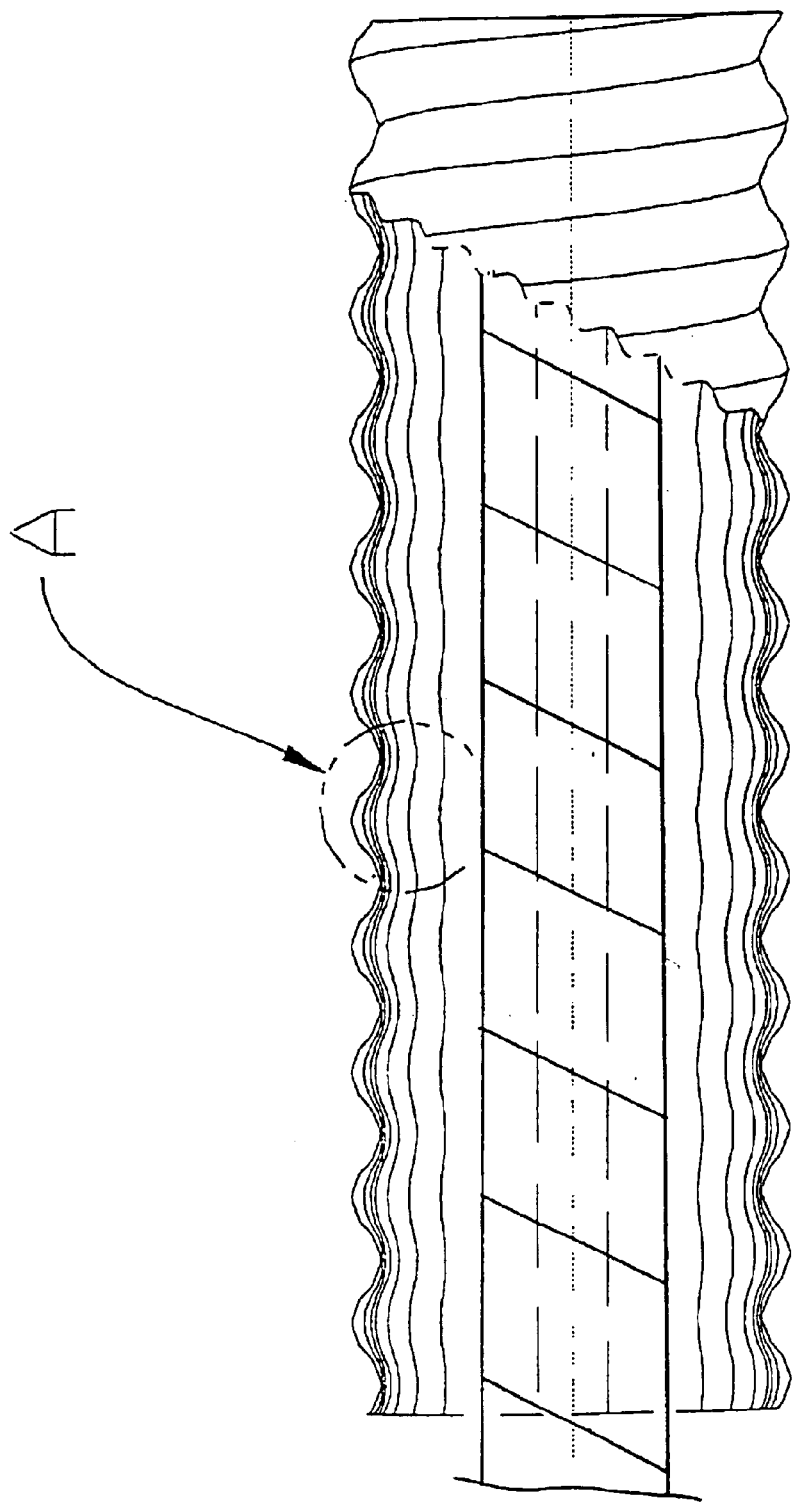
FIG. 5A is a cross sectional views of the fiber structure of the rod of FIG. 3A showing the provision of a fixed stationary mandrel within the die.
Figure 5B:
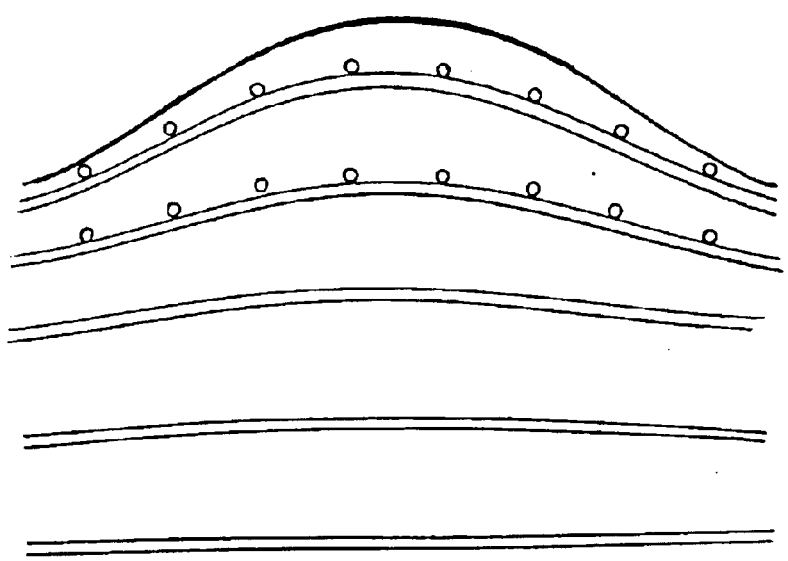
FIG. 5B is a cross sectional views of a portion of the fiber structure of the rod of FIG. 5A showing the distortion of fibers from the mat within the die.
Figure 5C:
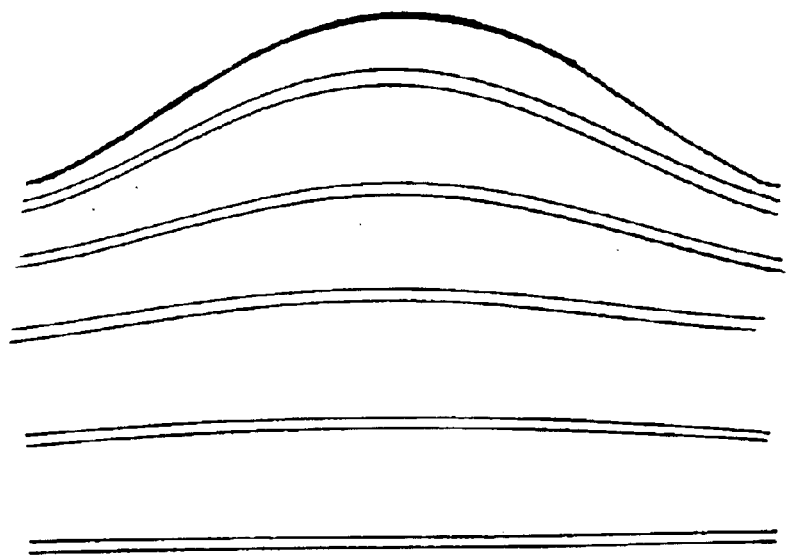
FIG. 5C is a cross sectional views of a portion of the fiber structure of the rod of FIG. 5A showing the distortion of helically wound fibers within the die.

As shown in FIGS. 5A, 5B and 5C, the outermost fibers of the fibrous structure are distorted by the compression on the fibrous structure and resin as the resin is squeezed so that the outermost fibers extend from the core of the rod inside the root of the threads into the area under the crest of the threads. In the arrangement where mat is applied on the outside, the distorted fibers are mainly mat fibers so that they can include some transverse fibers not just longitudinal fibers as shown. In the arrangement where the helical fibers are applied, the distorted fibers will be mainly helical fibers. In both cases, the use of mat and/or helical fibers may assist in distorting the fibers since they tend to be under less tension than the longitudinal fibers themselves. However, the construction can be formed wholly using longitudinal continuous rovings where the roving fibers pass from the core into the threads and back to the core. This provides the best strength since the fibers in the threads are continuous and therefore must be broken before stripping of the thread occurs.

Figure 3A:
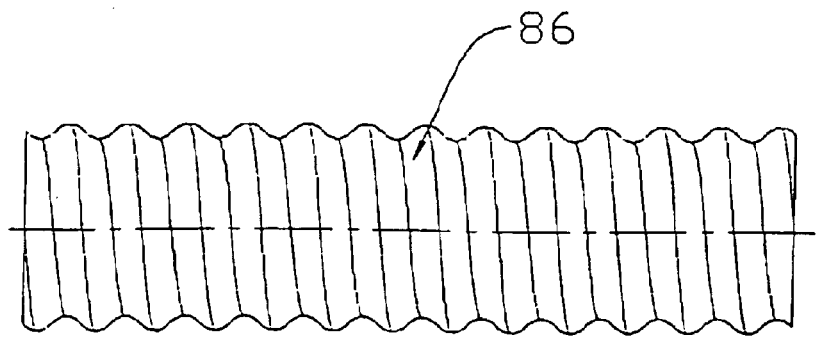
FIGS. 3A and 3B are side elevational and end elevational views respectively of a threaded rod formed by the method of the present invention.
Figure 4A:
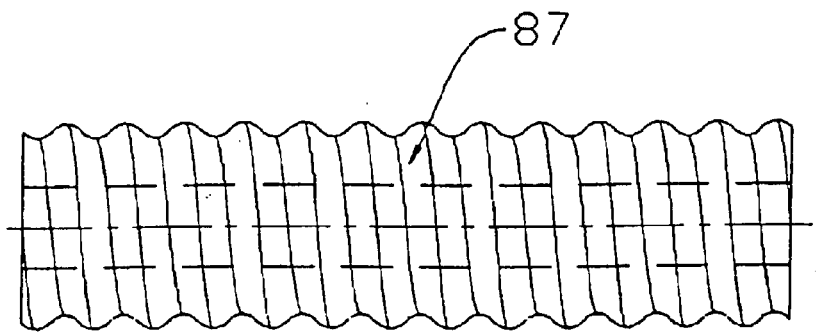
FIGS. 4A and 4B are side elevational and end elevational views respectively of a tube formed by the method of the present invention.

If a threaded FRP tubing 87 shown in FIG. 4A or 5A is required to be produced rather than a solid threaded rod 86 shown in FIG. 3A, the winding must use a stationary mandrel as shown in FIG. 5A or a plastics tubing core as shown in FIG. 4A placed along the center of the longitudinal oriented fibers to make a hollow shape.

Figure 3B:
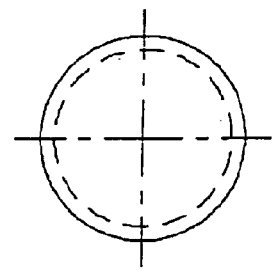

The wound and impregnated material 43 then proceeds to the two halves die autoclave station 50 for producing the fully threaded composite rod (FIG. 3). The threads are formed at the outside of the materials and the materials are compressed and squeezed to expel excess resin out during the autoclave process. If the threaded tubing is required, a removable or plastics tubing core mandrel must be placed along the center of the longitudinal oriented fibers to make a hollow shape.

The preferred two halves die autoclave process is illustrated schematically in FIG. 2A. Two alternative arrangements including the reciprocating die autoclave is illustrated schematically in FIG. 2B and the tractor die autoclave process is illustrated schematically in FIG. 2C. Each of the process is described separately hereinbelow.

Figure 4B:
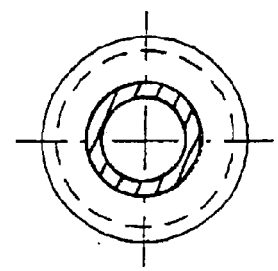

The two halves die station 50 (FIG. 2A) mainly includes an upper mold 51 with few upper heating elements 52, a lower mold 53 with few lower heating elements 54, and two hydraulic cylinders for clamping the two molds. The upper mold 53 is operated by the hydraulic cylinder 55. Heat is applied to the upper and lower molds 51 and 53 to initiate the thermosetting reaction of the resin. A few heater cartridges that employ electrical resistance are positioned at longitudinally spaced desired locations inside both the molds. Thermocouples are also placed inside the molds to control the level of heating applied. Multiple individually-controlled zones can be configured in this manner. After the wound and impregnated material 43 is pulled along the longitudinal direction and seated on the lower mold 53, the upper mold 51 presses the material 43 down to the lower mold 53. Since the upper and lower molds have an internal surface with the threaded features, the materials 43 takes a threaded shape corresponding to the internal profile of the molds. Also, as the material 43 is placed between the mold 51 and mold 53, the thermosetting resin reacts under the heat and pressure and partially cures. Under a certain amount of molding pressure, some resin is squeezed out of the impregnated fibers into the mold internal surface, and acts to push the outer fibers or mats, which may include the wrapped fibers or mats and the longitudinal oriented fibers towards the outer circumference of the internal thread of the molds (FIG. 4). The lower mold 53 is fastened in a stationary frame.

After the material is cured and formed threaded surface, the upper mold 51 is released and the material is pulled a length of the mold 51 (or mold 53) and then the autoclave process starts another cycle. If a threaded FRP tubing 87 shown in FIG. 4A is required to be produced rather than a solid threaded rod 86 shown in FIG. 3A, the autoclave process uses a stationary mandrel placed along the center of the longitudinal oriented fibers to make a hollow shape of the product, and after curing, the mandrel is removed from the product, or the autoclave process can use a plastics tubing core to make a hollow shape of the product to get a threaded tubing product.

In FIGS. 6 through 9 is shown the construction of a die formed of two die parts including an upper part 60 and a lower part 61 which include part cylindrical surfaces 62 and 63 respectively which together in the closed position shown in FIG. 7 define the hollow interior of the die including the thread 64. Each die part includes a main metal die block cooled by heating ducts 65. An insulation piece 66 separates the metal block from the die portion itself which defines the surfaces 62 and 63 and is indicated at 66. The die portions 66 are heated by a longitudinally extending resistance heating elements 67.

The die blocks are shaped so as to define on one side of the hollow interior of the die mating surfaces 60A and 60B and on the other side mating surfaces 60C and 60D. It will be noted that these are offset so that they do not lie in a common plane but instead intersect with the hollow interior of the die at edges 60E and 60F respectively. Thus the die part 62 extends from the edge 60E to the edge 60F and also the die part 63 extends from the same edges 60E to 60F with a line joining those edges being inclined to the mating surfaces 60A through 60D. The line joining the edges is indicated at 60G and extends through the center 60H of the hollow interior so that it forms a diameter of the hollow interior and the die part 62 and 63 each form a semi-cylindrical surface.

Figure 8:
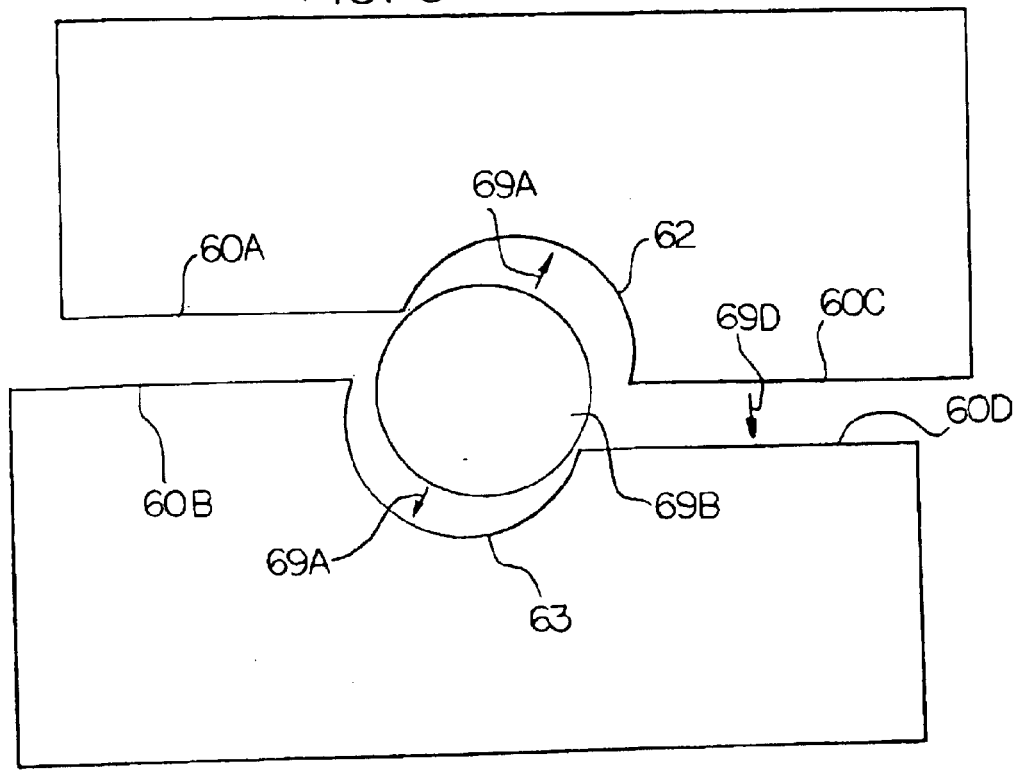
Figure 9:
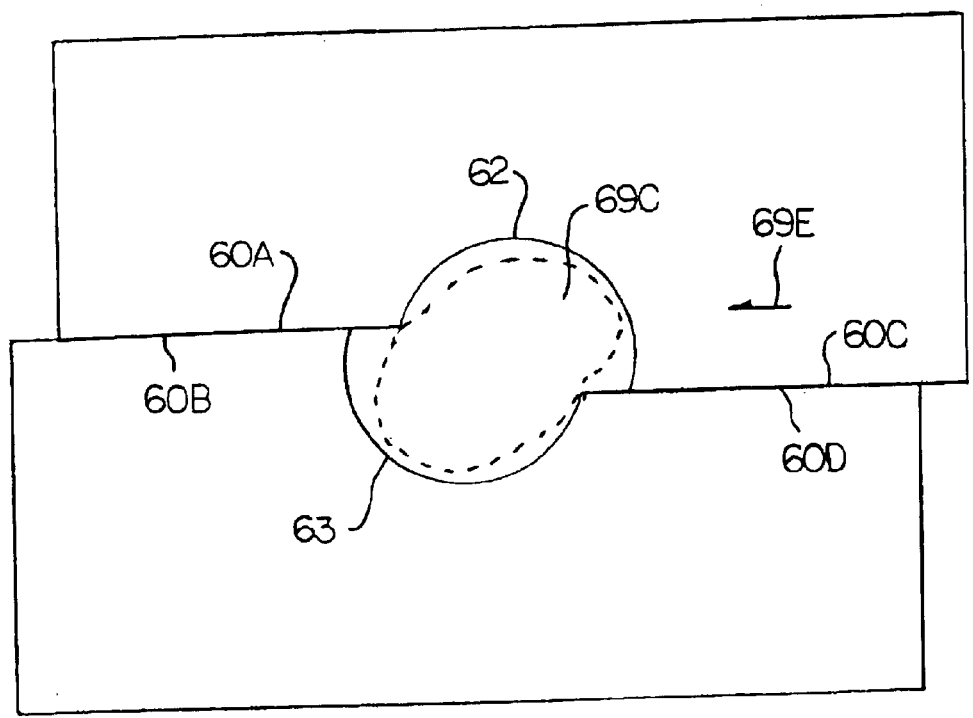

In operation the die parts move relative to each other in a generally triangular path of movement from the closed position shown in FIG. 7 to the release position shown in FIG. 8 and back to the closed position shown in FIG. 7 through the position shown in FIG. 9.

This triangular movement includes a first direction 69A shown in FIG. 7 where the die parts move from the closed position to the release position in a direction generally at right angles to the plane 60G containing the edges 60E and 60F. Thus the die parts move so that the two semi-cylindrical surfaces move radially apart along the line 69A generally at right angles to the plane 60G. This acts to release the molded part 69B and breaks the surfaces 62 and 63 away from the molded part.

In the next movement, after the pulling action on the molded part has moved a new portion of the rod into position as shown at 69C in FIG. 9, the die parts are moved in the direction 69D so as to move the mating surfaces together while the die parts 62 and 63 remain axially offset. This movement brings the die parts to the position shown in FIG. 9 where the mating surfaces engage on each side of the hollow interior while hollow interior is not cylindrical but is shaped with two lobes or receiving areas each formed by respective one of the die parts 62 and 63.

The third part of the movement is effected in the direction 69E in which the mating surfaces slide along each other and the die parts 62 and 63 move together back to the axially aligned position shown in FIG. 7. This sliding movement acts to sweep any resin material resting on the mating surfaces back into the hollow interior so that the resin can be squeezed, any excess resin expelled from the ends of the hollow interior and the resin set within the hollow interior by the heating action of the heating elements 67.

This sweeping action thus avoids the possibility of any resin becoming set on the mating surfaces which would interfere with proper closure of the die parts in the position shown in FIG. 7. The triangular movement ensures that the die parts properly break open to break away from the molded part as shown in FIG. 8. Slight distortion of the rod prior to molding is caused by the distortion of the hollow interior as shown in FIG. 9 but at this point in the formation of the structure the rod is squeezable to obtain the necessary distortion since the resin is unset and since the fibers can be moved relative to each other during the squeezing action. The sliding action of the mating surfaces also ensure that no fibers are pinched between the mating surfaces as the mating surfaces are brought together and as the mating surfaces are slid one relative to the other in movement to the closed position. Any fibers that are exposed beyond the edges of the hollow interior are therefore pushed into the hollow interior by the sliding action of the mating surfaces.

The offset of the mating surfaces 60A and 60B relative to the plane of the surfaces 60C and 60D is desirable so as to reduce the amount of distortion necessary for the rod. However the same arrangement can be used in some cases where the surfaces 60A and 60B lie in the same plane as the surfaces 60C and 60D. In this arrangement a rectangular movement of the die parts is necessary so as to move the die parts initially apart from the closed position in a direction at right angles to the mating plane and then move the mating surfaces transversely parallel to the mating plane before moving the die parts to the position shown in FIG. 9 where the mating surfaces are in contact and the die parts 62 and 63 transverse offset.

If a threaded FRP tubing 87 shown in FIG. 4A or 5A is required to be produced rather than a solid threaded rod 86 shown in FIG. 3A, the autoclave process uses a stationary mandrel placed along the center of the longitudinal oriented fibers to make a hollow shape of the product, and after curing, the mandrel is removed from the product, or the autoclave process can use a plastics tubing core to make a hollow shape of the product to get a threaded tubing product.

The above arrangements provide a rod which has the threaded sections equal in length to the molds and separated each from the next by a short smooth section.

Turning again in FIG. 1, the pulling force in the production line is provided by a pulling station 80, which mainly comprises few pairs of friction rollers 81 and 82. This kind of puller can be adjusted very easily. After the material 85 (FIG. 1) exits the pulling station 80, the threaded products are produced. The threaded product can be sent to a cutting station 90 to cut. As a final step, a cut-off saw 91 operable coupled with a computer cuts the product 86 to a desired predetermined length. The programmable computer and a sensor or other control means monitors the lengths of rod 86 produced during the process. The individual rods 86 are then conveyed to an off-loading station for packing.

Figure 2B:
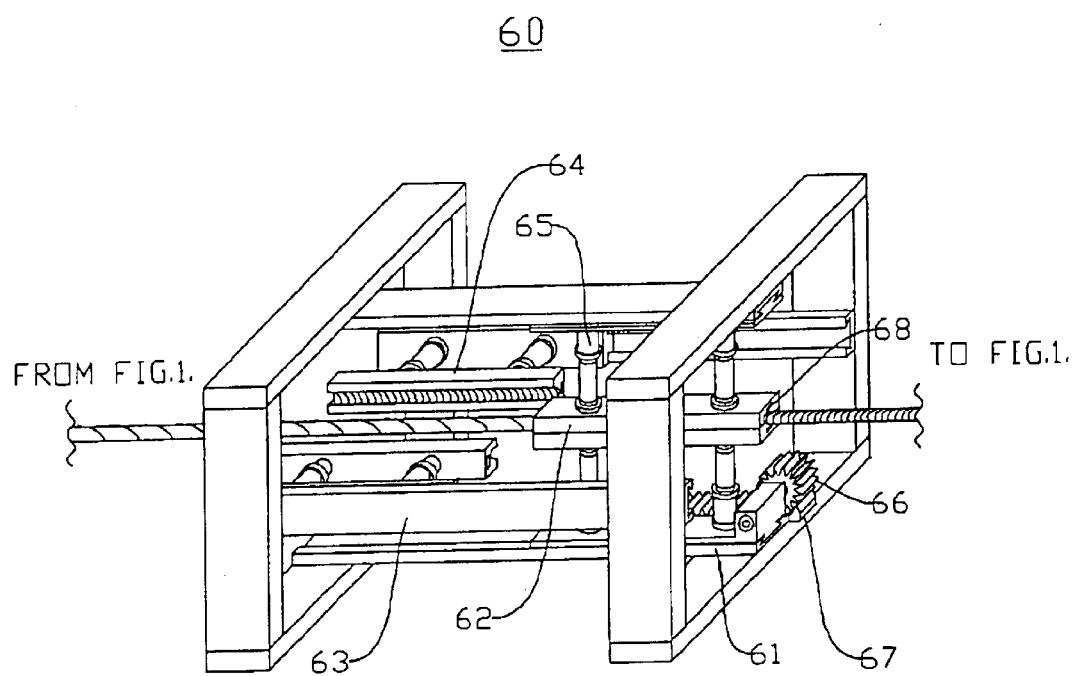
FIG. 2B is a schematic representation of an alternative but less preferred method of a reciprocating die autoclave for producing the fully threaded composite rod indicated in FIG. 1.
Figure 2C:
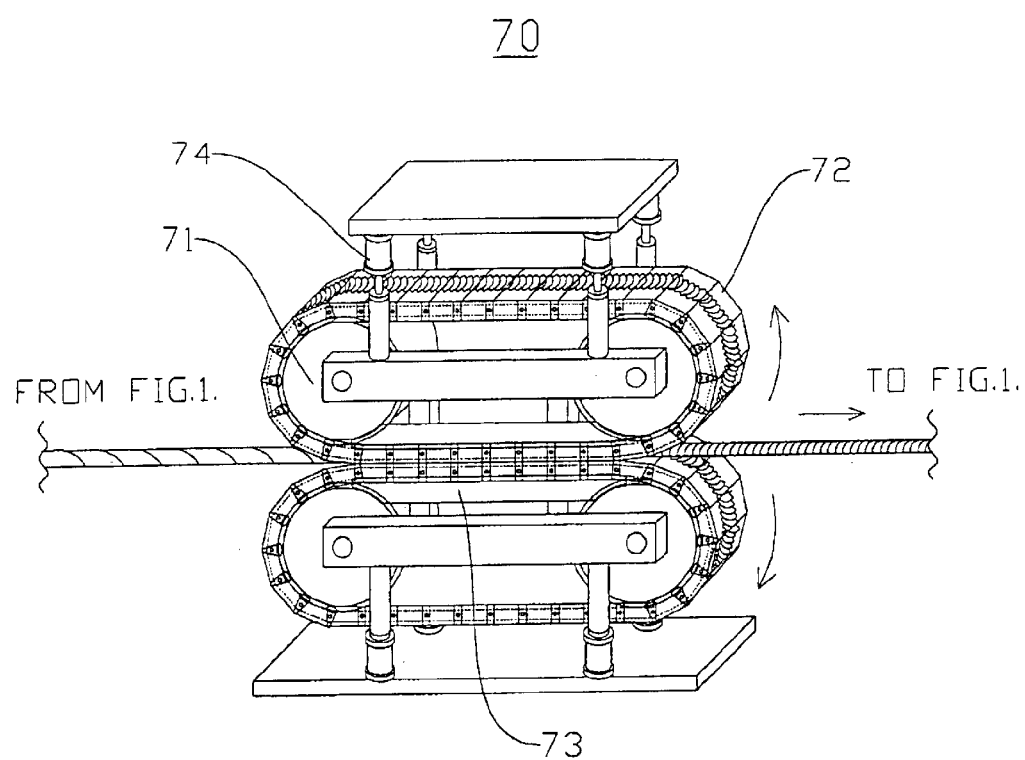
FIG. 2C is a schematic illustration of an alternative but less preferred method of a tractor die autoclave to form the fully threaded composite rod indicated in FIG. 1.

The alternative reciprocating die autoclave station 60 (FIG. 2B) comprises a pair of vertical mold halve 62, and a pair of vertical mold support rails 61, and a pair of horizontal mold halves 64, and a pair of horizontal mold support rails 63, and several cylinders 65 for clamping the molds, and two pairs of gear 66 and rack 67 for reciprocating the molds. The operation principle of the reciprocating dies substantially as previously described. This process acts alike a pair of the two halves die which works in a same time with a matched sequence. For example, after the material 43 is pulled into the space between the pairs of the reciprocating dies, the pair of vertical mold halves 62 clamps and holds the materials to form the threaded profile, while it travels backwards driven by the gear-rack 66 and 67 along the vertical support rails 61. While the vertical mold halves capture the impregnated material and go backwards, the material is gradually cured and a fully threaded profile of a rod is formed as shown in FIG. 2B. At the same time, the pair of the horizontal mold halves 64 opens and travels towards the front of the station along the horizontal support rails 63. As soon as the horizontal mold halves 64 arrive the front end of the horizontal support rails 63 and the vertical mold halves 62 reach the back end of the vertical support rails 61, the horizontal mold halves start to clamp for forming another segment of threaded profile as shown in FIG. 2B. After the threaded profile segment is formed by the vertical mold halves, the vertical mold halves release and then go to the front. At the same time, the clamped horizontal mold halves move backward along the horizontal support rails. After the clamped horizontal mold halves arrive the back end of the horizontal rails and another threaded segment is formed, and then the horizontal mold halves start to releasing, the vertical mold halves start clamping, in this way, the process is repeated. Therefore, the two pairs of mold halves reciprocate to produce a length of the threaded features along the production line.

Figure 2D:
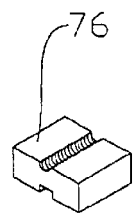
FIG. 2D is a scrap view of one element of the embodiment of FIG. 2C.

The alternative tractor die station 70 (FIG. 2C) mainly includes a pair of endless series 72 of mold halves 76, and two sets of sprockets 71, and a pair of heating platens 73 and several hydraulic rams 74. The several small die sections 76, one of which is shown in FIG. 2D, link together via an interlocking chain mechanism. There are two mating halves on these interlocking chained die sections opposing each other. Each half of the die section has a cavity with a threaded interval. The chained die sections are linked together and extend two to three feet in length and wrapped around a set of sprockets to form a continuous chain. The inside cavity of the die section faces an identical chain of die cavities directly across from them. The two opposing die chain cavities face each other and rotate around their respective sprockets. When the die cavities come in contact with the resin-impregnated fiber the die captures the resin-impregnated fiber and also pulls the fibers along the longitudinal direction from left to right, shown in FIG. 2C.

The backside of the die cavities rides on a heating platen 73 that transfers heat to the chained die sections. This causes the resin-impregnated fiber material to cure and solidify while the material is being pulled by the two halves of the tractor die cavities. As the die cavities capture the material, the die cavities are squeezed together by a hydraulic clamping system 74. This causes the material to take on the impression of the threaded profile inside the die cavities. While the die sections travel backwards (or to the right shown in FIG. 2C), the resin gradually cures and a complete fully threaded product is formed. Once the cured product escapes from the rear of the tractor die, a pulling mechanism (as described as a pulling station as follows) is to be required to maintain the straightness of the product.

This arrangement produces a threaded rod where the thread is continuous without smooth sections since each die section can be co-ordinated with the previous so that the thread continues through the die intersection. The die sections are arranged to allow the excess resin squeezed from the rod to escape between the die sections. The die sections can include areas, preferably between the die sections, which are cooled so as to maintain the escaping resin in a cooled condition separate from the heating zone so that the escaping resin does not set to require messy clean-up and can be re-used.

If a threaded FRP tubing 87 shown in FIG. 4A is required to be produced rather than a solid threaded rod 86 shown in FIG. 3A, the autoclave process uses a stationary mandrel placed along the center of the longitudinal oriented fibers to make a hollow shape of the product, and after curing, the mandrel is removed from the product, or the autoclave process can use a plastics tubing core to make a hollow shape of the product to get a threaded tubing product.

The foregoing discussion demonstrates that the apparatuses of the present invention can be used to produce threaded reinforced composite threaded rods or tubing using as desired methods. The manufacture of the threaded composite rod product enables the manufacture to choose whichever autoclave process is desired as the need arises without investing in multiple autoclave lines, thereby reducing the cost of production. In the drawings and specification, there have been set forth preferred embodiments of the invention and, although specific terms are employed, the terms are used in a generic and descriptive sense only and not for purposes of limitation.

What is claimed is:

1. A method for forming a molded rod comprising:
    providing a longitudinally continuous fibrous structure formed of a plurality of fibers;
    the fibrous structure including longitudinally extending continuous fibers;
    impregnating the fibrous structure with a settable resin;
    collating the impregnated fibrous structure including the longitudinally extending continuous fibers into an elongate continuous rod in which the resin throughout the rod is an un-set condition;
    providing a generally cylindrical die having a plurality of die parts for surrounding a portion of the rod and for extending along a part of the length of the rod, which die parts can be opened in a direction transverse to the length of the rod to receive the rod and clamped together to form a hollow die interior defining a generally cylindrical shape;
    in a compression step, closing the die parts into a closed position onto the portion of the length of the impregnated fibrous structure while the resin remains in the un-set condition so as to apply a compressive force from the die parts onto the rod in a direction transverse to the length to cause the portion of the fibrous structure to conform to the shape of the hollow interior;
    heating the die parts to set the resin in the portion;
    and moving the die parts from the closed position to a release position;
    wherein the die parts include a first die part having a first part cylindrical surface defining a first die part axis and a second die part, having a second part cylindrical surface defining a second die part axis forming a part of the hollow die interior defining the generally cylindrical shape such that, when the die parts are in closed position, the part cylindrical surfaces have the first and second die part axes thereof coaxial to form the hollow die interior;
    wherein the first die part and the second die part each include parallel mating surfaces on each side of the part cylindrical surface;
    and wherein the first and second die parts are moved in the compression step from the release position in which the mating surfaces of the first die part are spaced from the mating surfaces of the second die part in a first direction transverse to the mating surfaces to bring the mating surfaces into contact together with the part cylindrical surfaces offset in an offset direction at right angles to the first and second die part axes so that the first and second die part axes are offset and in a second direction parallel to the mating surfaces and along said offset direction to bring the part cylindrical surfaces into the closed co-axial position to form the hollow die interior into the generally cylindrical shape.

2. The method according to claim 1 wherein the mating surfaces of the first and second die parts on one side of the part cylindrical surfaces lie in a first plane which is parallel to and spaced from a second plane containing the mating surfaces of the first and second die parts on an opposed side of the part cylindrical surfaces.

3. The method according to claim 2 wherein the first and second die parts are moved from the closed position to the release position in a direction which is substantially at right angles to a plane intersecting edges of the part cylindrical surfaces.

4. The method according to claim 3 wherein the first and second die parts move from the closed position to the release position and back to the closed position in a generally triangular path.

5. The method according to claim 2 wherein the first and second die parts are moved from the closed position to the release position in a direction which is inclined to a right angle to the mating surfaces.

6. The method according to claim 2 wherein the movement of the first and second die parts in the second direction, with the mating surfaces in contact, causes un-set resin to be swept from the mating surfaces into the hollow die interior.

7. A method for forming a molded rod comprising:
    providing a longitudinally continuous fibrous structure formed of a plurality of fibers:
    the fibrous structure including longitudinally extending continuous fibers;
    impregnating the fibrous structure with a settable resin;
    collating the impregnated fibrous structure including the longitudinally extending continuous fibers into an elongate continuous rod in which the resin throughout the rod is an un-set condition;
    providing a generally cylindrical die having a plurality of die parts for surrounding a portion of the rod and for extending along a part of the length of the rod, which die parts can be opened in a direction transverse to the length of the rod to receive the rod and clamped together to form a hollow die interior defining a generally cylindrical shape;
    in a compression step, closing the die parts into a closed position onto the portion of the length of the impregnated fibrous structure while the resin remains in the un-set condition so as to apply a compressive force from the die parts onto the rod in a direction transverse to the length to cause the portion of the fibrous structure to conform to the shape of the hollow interior;
    heating the die parts to set the resin in the portion;
    and moving the die parts from the closed position to a release position;
    wherein the die parts include a first die part and a second die part, each of the die parts having a part cylindrical surface forming a part of the hollow die interior defining the generally cylindrical shape such that, when the die parts are in closed position, the part cylindrical surfaces are coaxial to form the hollow die interior;

wherein the first die part and the second die part each include parallel mating surfaces on each side of the part cylindrical surface;

and wherein the mating surfaces of the first and second die parts on one side of the part cylindrical surfaces lie in a first plane which is parallel to and spaced from a second plane containing the mating surfaces of the first and second die parts on an opposed side of the part cylindrical surfaces.

8. The method according to claim 7 wherein the first and second die parts are moved from the closed position to the release position in a direction which is inclined to a right angle to the mating surfaces.

9. The method according to claim 7 wherein the first and second die parts are moved from the closed position to the release position in a direction which is substantially at right angles to a plane intersecting edges of the part cylindrical surfaces.

* * * * *